INVENTOR
DARREL M. HARRIS
BY Robert J. Schaap
ATTORNEY

|←1MM→|

|←100μ→|

|←100μ→|

|←100μ→|

|←100μ→|

|←100μ→|

INVENTOR.
DARREL M. HARRIS
BY Robert J. Schaap
ATTORNEY

INVENTOR.
DARREL M. HARRIS
BY Robert J. Schaap
ATTORNEY

INVENTOR
DARREL M. HARRIS

BY Robert J. Schaap
ATTORNEY

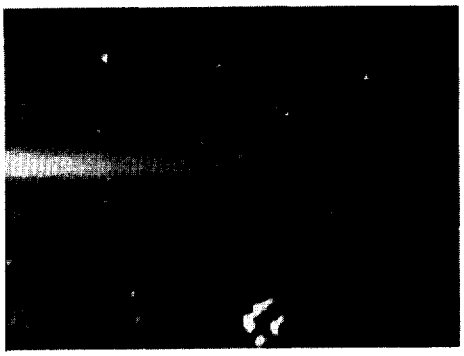
FIG. 15
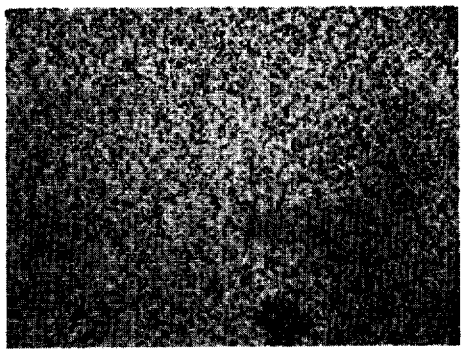
FIG. 16
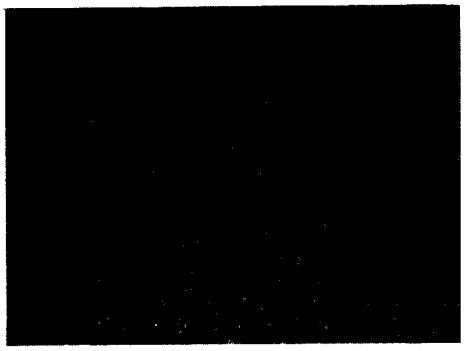
FIG. 17
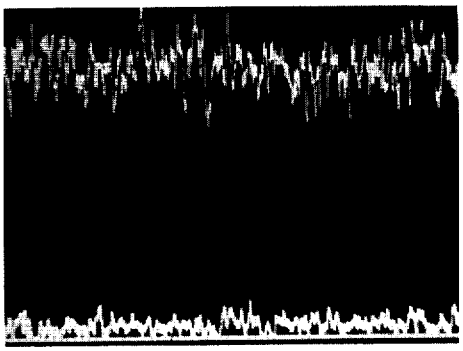
FIG. 18
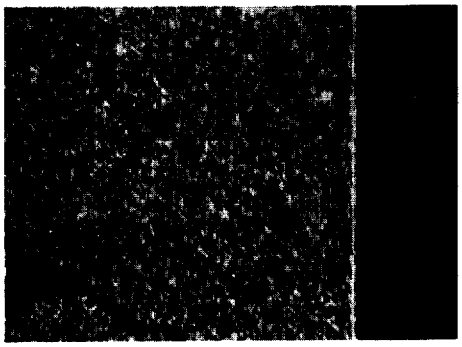
FIG. 19 ⊣ 1MM ⊢
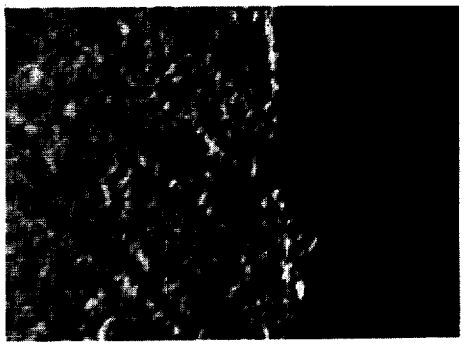
FIG. 20 ⊣ 100 μ ⊢
INVENTOR.
DARREL M. HARRIS
BY Robert J. Schaap
ATTORNEY

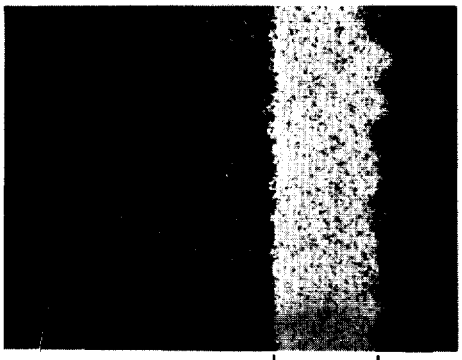
FIG. 21 100μ
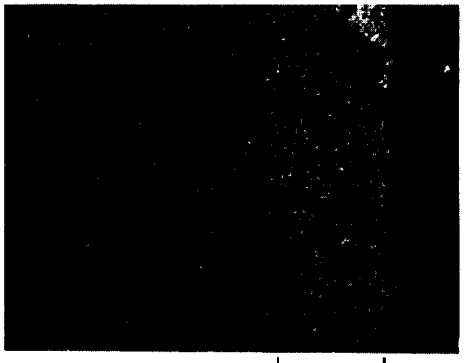
FIG. 22 100μ
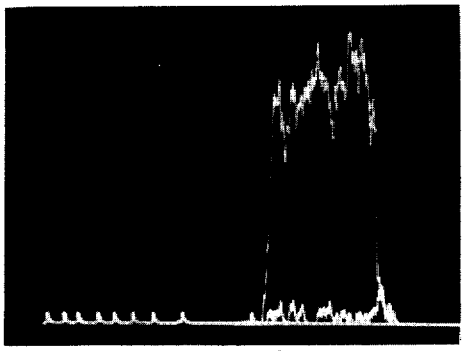
FIG. 23 100μ
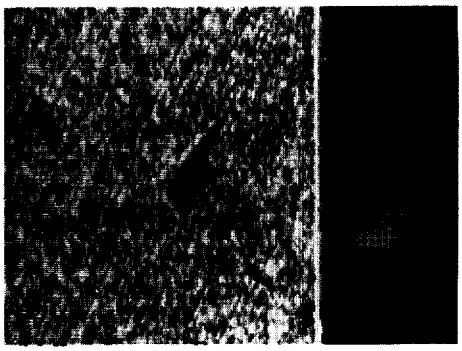
FIG. 24 1MM
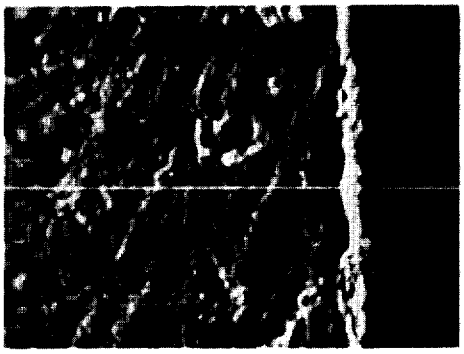
FIG. 25 100μ
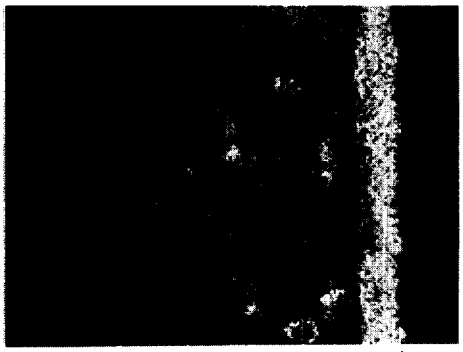
FIG. 26 100μ
INVENTOR.
DARREL M. HARRIS
BY Robert J. Schaap
ATTORNEY

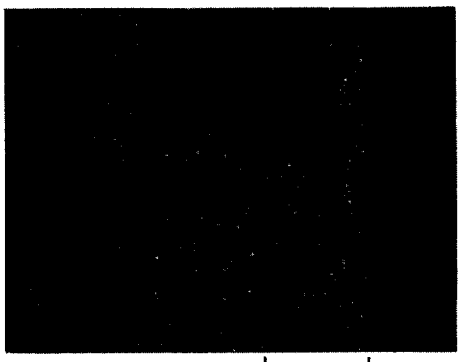
FIG. 27 ⊣ 100μ ⊢
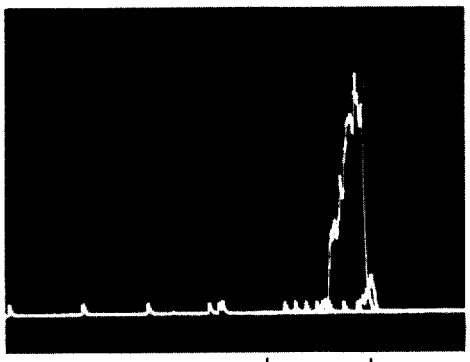
FIG. 28 ⊣ 100μ ⊢
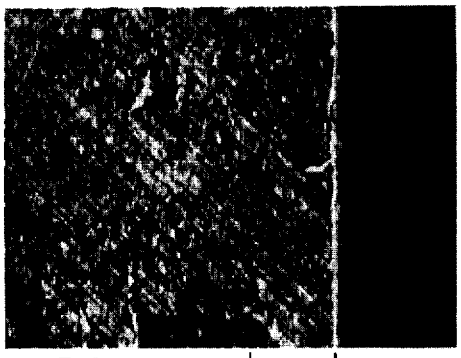
FIG. 29 ⊣ 1MM ⊢
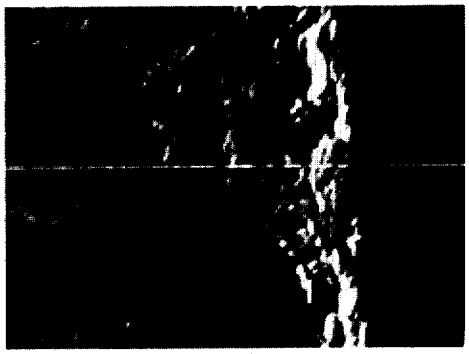
FIG. 30 ⊣ 1μ ⊢
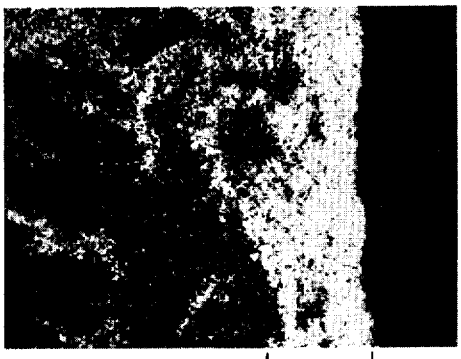
FIG. 31 ⊣ 1μ ⊢
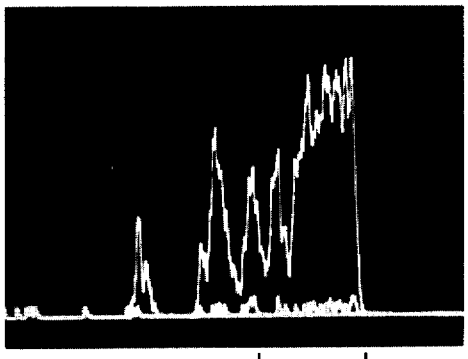
FIG. 32 ⊣ 1μ ⊢
INVENTOR.
DARREL M. HARRIS
BY Robert J. Schaap
ATTORNEY

——————— % SILICON

INVENTOR
DARREL M. HARRIS
BY Robert J. Schaap
ATTORNEY

——— % SILICON

— — — % SILICON CARBIDE

INVENTOR
DARREL M. HARRIS
BY Robert J. Schaap
ATTORNEY

United States Patent Office

Re. 26,885
Reissued May 19, 1970

26,885

RESISTANCE HEATING ELEMENTS AND METHOD OF CONDITIONING THE HEATING SURFACES THEREOF

Darrel M. Harris, Kirkwood, Mo., assignor to Monsanto Company, St. Louis, Mo., a corporation of Delaware Original No. 3,406,044, dated Oct. 15, 1968, Ser. No. 423,066, Jan. 4, 1965, which is a continuation-in-part of application Ser. No. 308,859, Sept. 13, 1963. Application for reissue Dec. 23, 1968, Ser. No. 841,636
Int. Cl. B44d *1/18*
U.S. Cl. 117—215 18 Claims

Matter enclosed in heavy brackets [ ] appears in the original patent but forms no part of this reissue specification; matter printed in italics indicates the additions made by reissue.

ABSTRACT OF THE DISCLOSURE

Graphite heating elements which are used in epitaxial silicon furnaces and which are presently coated in order to prevent outgassing by vapor depositing a first layer of silicon on the bridge. The bridge is heated above the melting point of silicon causing the silicon to melt and fuse to the bridge and the temperature of the bridge is thereafter lowered. Silicon carbide is thereafter vapor deposited and becomes bonded to the silicon layer. A final coating of silicon is thereafter applied to the silicon carbide.

This application is a continuation-in-part of copending United States application Ser. No. 308,859, filed Sept. 13, 1963, now U.S. Patent No. 3,329,527, and which relates to graphite heating elements and the method of conditioning the heating surfaces thereof.

This invention relates in general to certain new and useful improvements in heating elements and more particularly, to a method of sealing the heating surfaces of such heating elements.

In recent years, semiconductor devices formed of silicon or various combinations of silicon with other elements, have found widespread use in the electronics industry. Many of these semiconductor devices are formed from silicon wafers which are surface treated in epitaxial silicon furnaces. The silicon wafers are placed upon a silicon furnace and are heated to approximately 1140° C. Following this, a mixture of relatively hot hydrogen and trichlorosilane is passed over the wafers. The hydrogen reacts with the trichlorosilane to form free silicon which deposits as a film on the surface of the wafers.

To be suitable for use in the subsequent manufacture of semiconductor elements, the silicon wafers must have an unusually high degree of purity. However, the graphite heating elements are rather porous and when subjected to high temperatures will emit considerable amounts of gas. This gas often reacts with the silicon wafer causing surface imperfections. Moreover, this emitted gas tends to interfere with the reaction between the hydrogen and trichlorosilane. Furthermore, the gas which is expelled by the heating element often carries impurities which might be contained in the heating element.

In order to overcome these defects, it has been necessary to degas the graphite heating element prior to actual use. This has been preformed by heating the graphite heating element in an epitaxial silicon furnace for a length of time which is equivalent to the time required to perform silicon film deposition on the wafers. Moreover, this operation must be repeated at least five or six times to assure complete degassing of the graphite heating element. This method not only results in unproductive lost time of the epitaxial silicon furnace, but consumes considerable labor cost as well. Furthermore, this method permits the heater to reabsorb water vapor when exposed to the atmosphere.

There have been various attempts in the prior art to coat the heating surface of the graphite heating elements in order to eliminate these time consuming atnd costly degassing operations. Some of these attempts included the passing of the trichlorosilane in hydrogen gases over the hot graphite heating element and reacting the gases in order to deposit a silicon film on the heating element. To date, these attempts to coat the surfaces of the heating element by film deposition have been largely unsuccessful. The gases were reacted at the normal operating temperature or 1140° C. and this resulted in a film of silicon which was deposited on the heating element, but did not in any way become fused to the surface of the graphite. Moreover, the silicon film remained rather pervious and therefore did not seal the gas contained within the graphite heating element.

It is therefore the primary object of the present invention to provide a method of treating the surfaces of a carbonaceous resistance heating element with a silicon containing film which renders the heating element completely imprevious to the passage of gas.

It is another object of the present invention to provide a method of applying a silicon film to the surface of a graphite heating element and which results in a substantially permanently fused protective layer.

It is a further object of the present invention to provide a method of applying a silicon carbide film to the surface of a graphite heating element and which results in a substantially permanently fused protective layer.

It is also an object of the present invention to provide a method of bonding silicon-containing films to the surface of a carbonaceous resistance heating element where the film does not interfere with the electrical properties or the heating capacity of the heating element.

It is still another object of the present invention to provide a method of the type stated which is relatively easy and inexpensive to perform and requires a minimum of nonproductive labor time.

It is another salient object of the present invention to provide a heating element having a gas impervious film fused to its exterior surfaces.

With the above and other objects in view, my invention resides in the novel features of form, construction, arrangement and combination of parts presently described and illustrated.

In the accompanying drawings (9 sheets):

Figure 6:
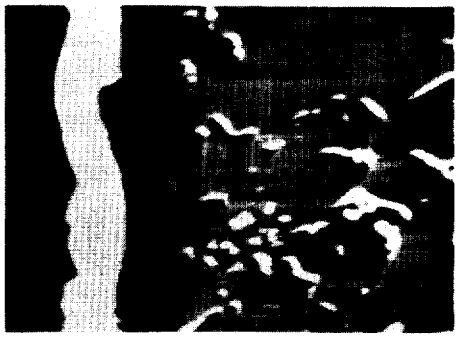
FIGURE 6 is a reproduction of an electron scattering image of a sample similar to the sample of FIGURE 3 and taken from a heating element where silicon film was deposited on the surface, rather than being fused to the surface thereof.
Figure 7:
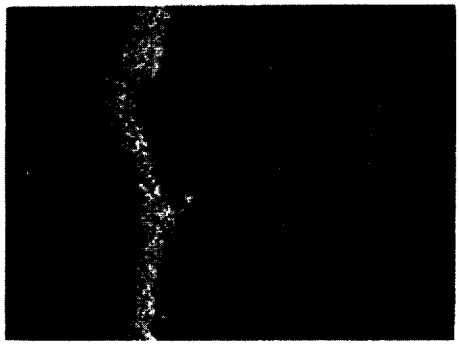
Figure 8:
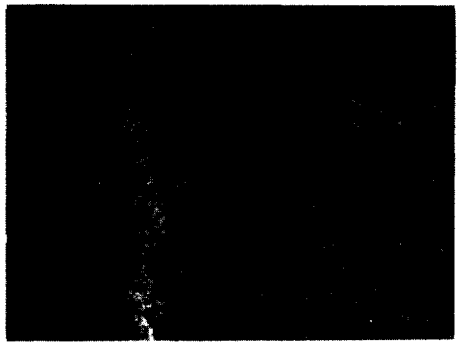
Figure 9:
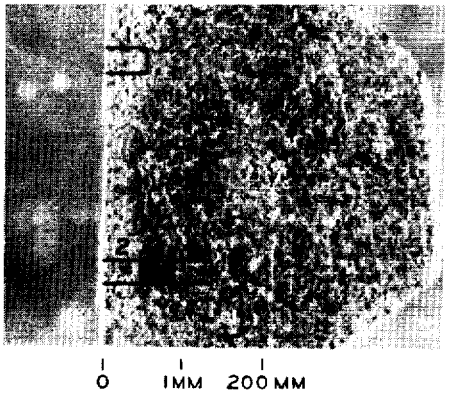
Figure 10:
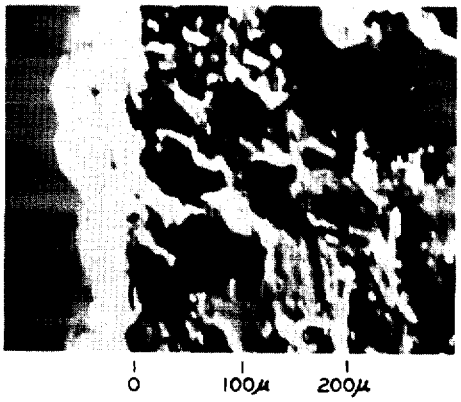
Figure 11:
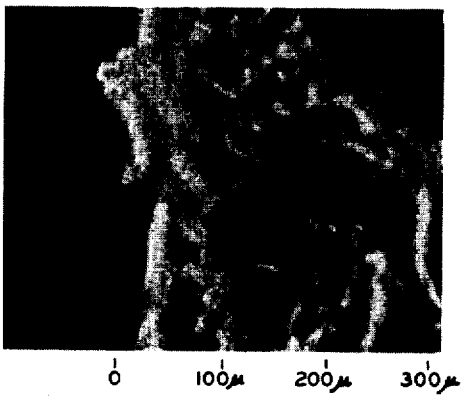
Figure 14:
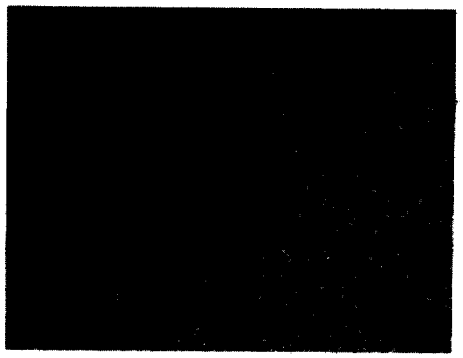
Figure 12:
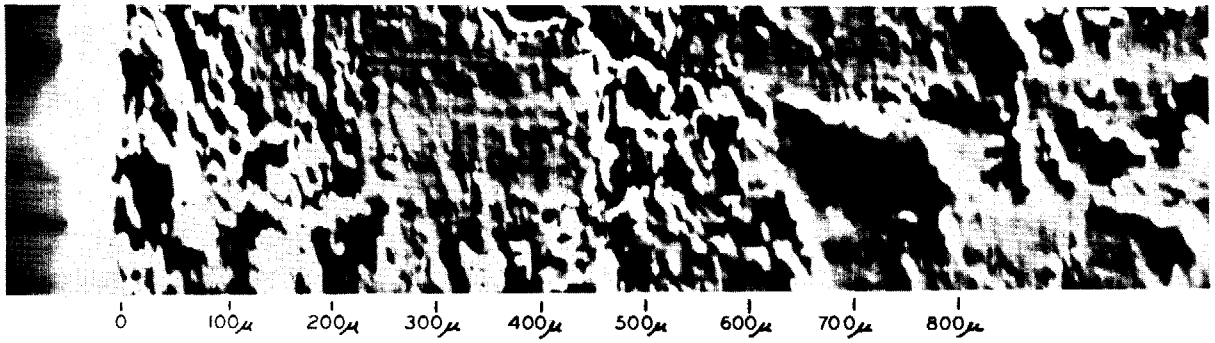
Figure 13:
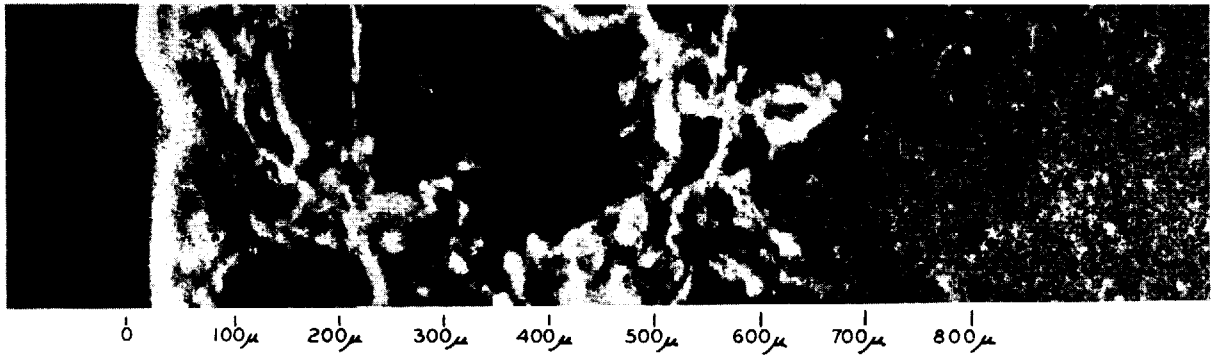
Figure 33:
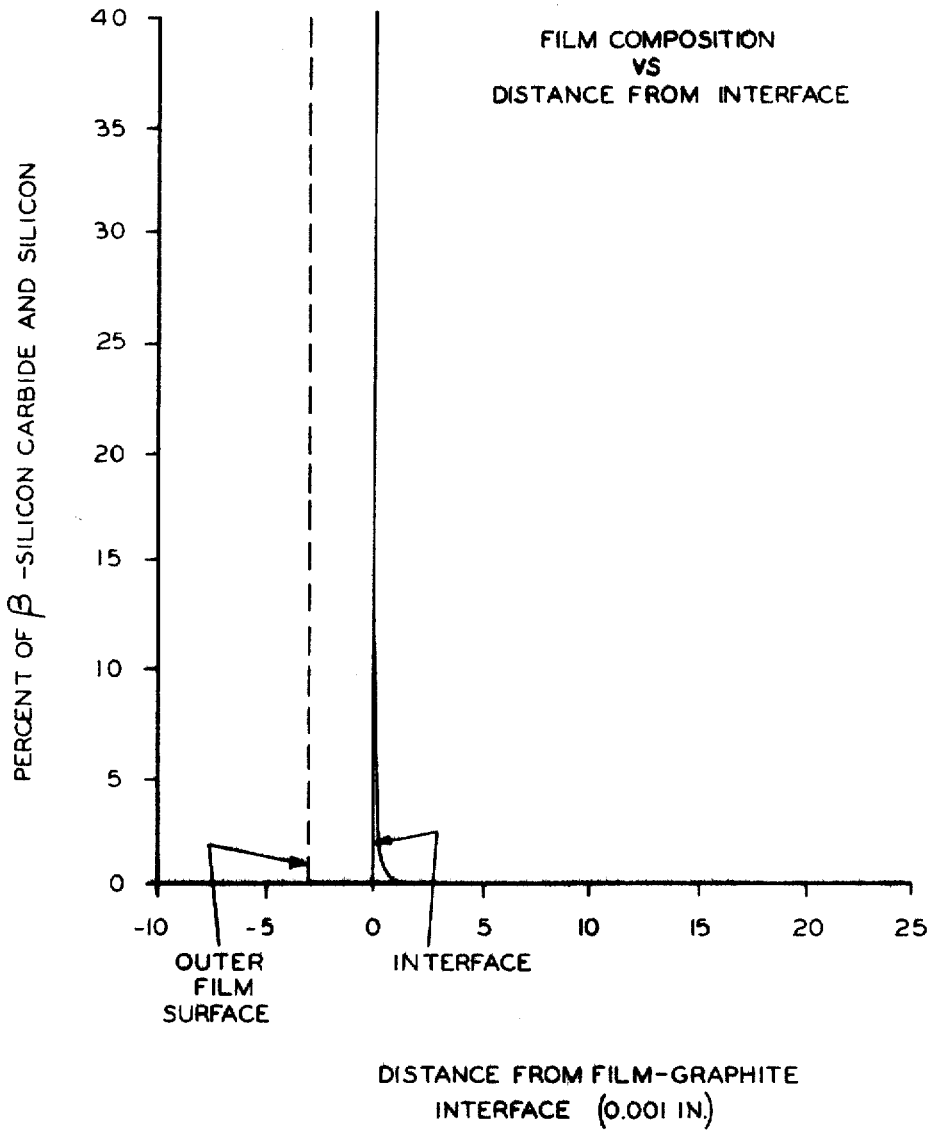
Figure 34:
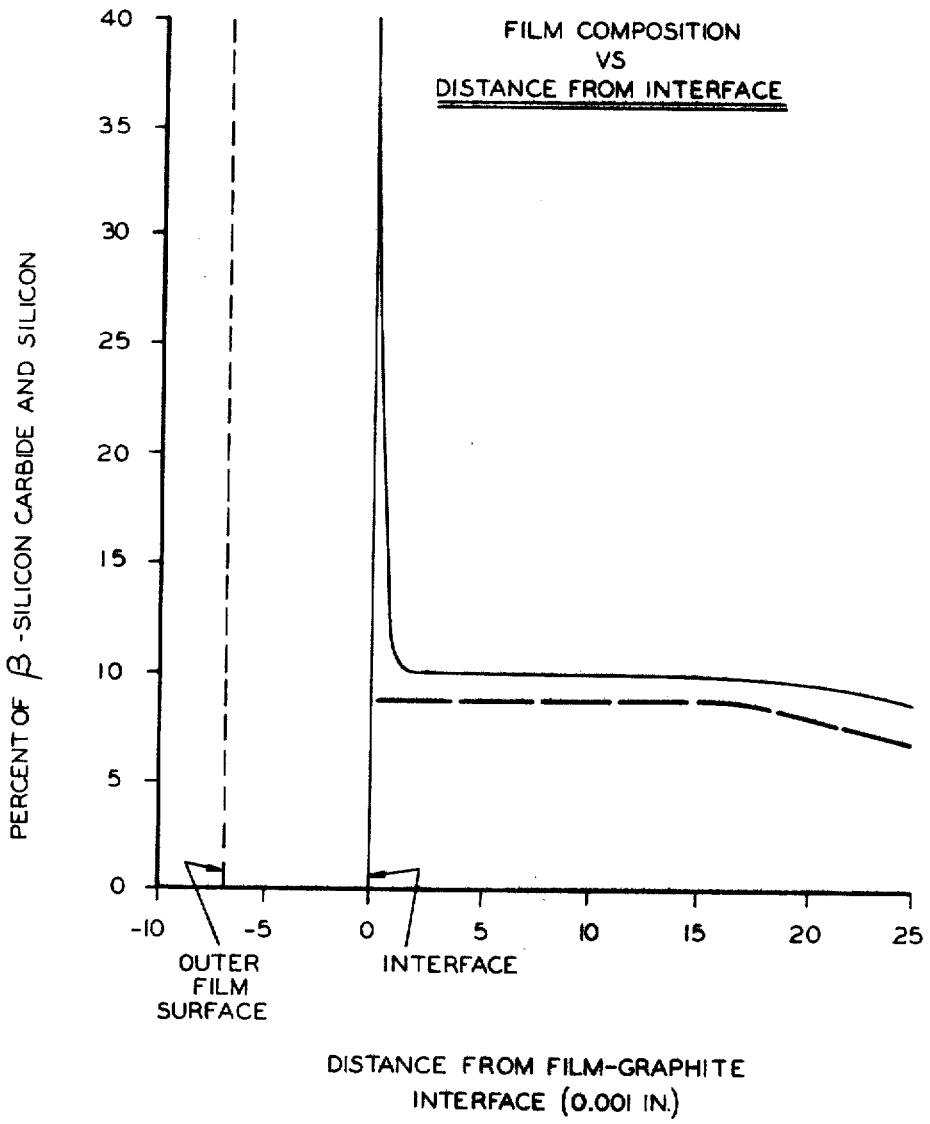

FIGURE 7 is a reproduction of an X-ray image of the sample of FIGURE 6 and showing degree of penetration of silicon;

FIGURE 8 is a reproduction of a background X-ray image of the sample used to make a scattered electron image of FIGURE 6 and the X-ray image of FIGURE 7;

FIGURE 9 is a reproduction of an optical micrograph of a sample from a graphite heating element, taken at fifteen times actual size and where the heating element is provided with a heavy silicon coating fused to the surface thereof;

FIGURE 10 is a reproduction of a scattered electron image of the field designated as 1 in FIGURE 9;

FIGURE 11 is a reproduction of an X-ray image of the field designated as 1 in the sample of FIGURE 9;

FIGURE 12 is a reproduction of a scattered electron image of the fields designated as 2, 3, and 4 in the sample of FIGURE 9;

FIGURE 13 is a reproduction of an X-ray image of the fields designated as 2, 3, and 4 in the sample of FIGURE 9;

FIGURE 14 is a reproduction of a background X-ray image of the field designated as 4 in the sample of FIGURE 9;

FIGURE 15 is a reproduction of an electron scattering image of a pure silicon standard sample at 200 times magnification;

FIGURE 16 is a reproduction of an X-ray image of the pure silicon sample which was used to produce the scattered electron image of FIGURE 15;

FIGURE 17 is a reproduction of a background X-ray image of the pure silicon sample used to make the scattered electron image of FIGURE 15 and the X-ray image of FIGURE 16;

FIGURE 18 is a reproduction of a slow scan concentration profile for silicon, a background image, and a base line for the standard silicon sample used to produce FIGURES 15–17;

FIGURE 19 is a reproduction of an optical micrograph taken at 20 times actual size of the sample of a graphite heating element which was provided with a beta-silicon carbide coating formed in accordance with the present invention;

FIGURE 20 is a reproduction of an electron scattering image of the sample of FIGURE 19 showing the surface contour thereof;

FIGURE 21 is a reproduction of an X-ray image of the sample of FIGURE 19 illustrating the thickness of the silicon carbide coating formed on the sample of FIGURE 19;

FIGURE 22 is a reproduction of a background X-ray image of the sample used to make the scattered electron image of FIGURE 20 and the X-ray image of FIGURE 21;

FIGURE 23 is a reproduction of a slow scan concentration profile showing silicon concentration, background concentration and base line for the sample of FIGURE 19;

FIGURE 24 is a reproduction of an optical micrograph taken at 20 times actual size of a graphite heating element which was provided with a beta-silicon carbide coating formed in accordance with the present invention and which was employed in commercial operations;

FIGURE 25 is a reproduction of an electron scattering image of the sample of FIGURE 24 showing the surface contour thereof and showing the scanning line used to produce an X-ray image of the sample of FIGURE 24;

FIGURE 26 is a reproduction of an X-ray image of the sample of FIGURE 24 showing the thickness of the silicon carbide coating and the degree of penetration thereof;

FIGURE 27 is a reproduction of a background X-ray image of the sample used to make the scattered electron image of FIGURE 25 and the X-ray image of FIGURE 26;

FIGURE 28 is a reproduction of a slow scan concentration profile for silicon concentration, background concentration and base line for the sample of FIGURE 24;

FIGURE 29 is a reproduction of an optical micrograph taken at 20 times actual size of a sample of a graphite heating element which was provided with a fused silicon coating, a silicon carbide coating, followed by a fused silicon coating formed in accordance with the present invention;

FIGURE 30 is a reproduction of an electron scattering image of the sample of FIGURE 29 showing the surface contour thereof; and also illustrating the scanning line used to produce the X-ray image of the sample of FIGURE 29;

FIGURE 31 is a reproduction of an X-ray image of the sample of FIGURE 29 illustrating the thickness of the coating thus produced and the degree of penetration thereof;

FIGURE 32 is a reproduction of a slow scan concentration profile showing silicon concentration, background concentration and base line for the sample of FIGURE 29;

FIGURE 33 is a graph showing the composition of silicon and silicon carbide in the heating element as a function of the distance from the film-graphite interface; and FIGURE 34 is a graph showing the composition of silicon and silicon carbide in the heating element as a function of the distance from the film graphite interface, when the heating element is provided with a heavy fused coating of silicon on its exterior surface.

GENERAL DESCRIPTION

According to the present invention, it has been found that by fusing a silicon film to the surface of the graphite heating element, and actually reacting the silicon with the graphite heating element a tightly adherent, substantially permanent gas impervious film is attained. Trichlorosilane gas is reacted with hydrogen at a temperature below the melting point of silicon and free silicon is produced according to the reaction:

$$H_2+HSiCl_3 \leftrightarrows 3HCl+Si$$

The silicon which is produced in the reaction between the gases is deposited on the surface of the graphite heating element. The temperature of the heating element is increased to raise the temperature of the silicon deposited thereon, above the melting point of silicon. At this temperature, a portion of the silicon partially reacts with the carbon of the heating element to form a silicon carbide film. The remainder of the silicon penetrates into the pores of the graphite and becomes fused to the graphite and thereby forms a layer which prevents outgassing during subsequent heating of the graphite heating element. As used herein, the term "fusing" refers to a melting or liquification of silicon which thereafter creates a physical and chemical binding or connection to the carbon atoms forming the graphite heating element. The term "bonding" as used herein refers to a physical attachment or binding of silicon or silicon carbide to carbon atoms of the graphite heating element or to other silicon atoms, but not necessarily through a melting or liquification process.

In a preferred embodiment of the present invention, it has been found that by producing silicon carbide independently of the graphite heater and depositing fine crystals of silicon carbide on the heater, a gas impervious film can be formed. The silicon carbide coating is prepared by the simultaneous reduction of trichlorosilane and chloroform by hydrogen according to the following reaction:

$$SiHCl_3+CHCl_3+2H_2 \rightarrow SiC+6HCl$$

The silicon carbide coating itself is actually partially bonded to the graphite heater.

In another preferred embodiment of the present invention, it has been found that an almost perfect gas-tight film can be formed by depositing a layer of silicon on the heater, fusing the silicon to the heater, depositing a layer of silicon carbide on the silicon surface, depositing a layer of silicon on the silicon carbide surface and finally fusing the last layer of silicon to the heater.

DETAILED DESCRIPTION

Referring now in more detail and by reference characters to the drawings, A designates a graphite heating element or so-called "bridge," consisting of a pair of horizontal legs 1, 2, connected by a bight portion 3. The construction of the graphite heating element A is conventional and is therefore not described in detail herein. However, it will suffice to point out that the legs 1, 2 have a length within the range of 24 to 36 inches and have a thickness of approximately ¼ to ⅜ of an inch.

In accordance with the present invention, the heating element A is suitably connected to the electrical contacts of an epitaxial silicon furnace (not shown), and enclosed within a gas-tight bell jar or so-called "hat" (also not shown). Relatively hot gaseous trichlorosilane and relatively pure hydrogen is passed into the bell jar and reacted according to the above reaction at approximately 1140° C. to produce hydrogen chloride which is vented from the bell jar, and elemental silicon which is deposited on the heating element A. Approximately 8.1 grams of trichlorosilane and 210 liters of hydrogen were passed into the bell jar and reacted for approximately 15 minutes to produce a silicon film 4 on the surface of heating element A. The resultant film had an electrical resistivity of approximately 1 to 2 ohm centimeters and a film thickness of approximately 0.0070 of an inch. The film does not in any way become fused to the graphite. X-ray diffraction analyses have shown that this film does not materially react with the graphite and the penetration into the pores of the graphite is so slight as to be negligible. It should be understood that it is possible to produce the silicon by these conventional methods such as the reduction of silicon chloride according to the following reaction:

$$SiCl+2H_4 \rightleftarrows Si+4HCl$$

After the initial coating of elemental silicon, the bridge A is heated to a temperature within the range of 1420° to 2000° C. for 2 minutes. The preferred temperature range is 1500–1550° C., which is considerably higher than the 1420° C. melting point temperature of elemental silicon. At this temperature, the silicon melts and diffuses into the pores of the graphite and moreover, actually becomes bonded to the graphite. X-ray diffraction analyses have shown that approximately 9.0 percent of the elemental silicon reacts with the graphite to form beta-silicon carbide up to a depth of about 0.015 of an inch. Thereafter, the amount of silicon carbide formation reduces with depth into the graphite. This amount of beta-silicon carbide formation is naturally affected somewhat by the amount of silicon deposited on the surface of the graphite. After the fusion process, the trichlorosilane gas and hydrogen is then passed into the bell jar for an additional fifteen-minute period at approximately 1140° C. for depositing an additional coating of elemental silicon on the surface of the heating element A, thereby forming a protective gas impervious silicon layer 4. Electron probe microanalyses have shown that the silicon penetrates approximately one-tenth millimeter by this process.

It has been found possible to produce a much heavier film of silicon by repeating the above process. In this latter process, the bridge is originally coated for 15 minutes in the manner previously described, heated to the range of 1500–1550° C. for 2 minutes thereby causing penetration of the elemental silicon and fusion with the graphite. An additional fifteen-minute coating period then follows at 1140° C. Following this, the bridge is then heated to 1500–1550° C. causing fusion of this second layer of silicon. The bridge is then coated for an additional one hour at 1140° C. and again fused at 1500–1550° C. Following this, an additional coating is applied at 1140° C. for one hour, the coating is fused at 1500–1550° C. for 2 minutes and followed by a final coating at 1140° C. for one hour. Electron probe microanalyses have shown that films applied in this manner penetrate into the graphite as much as 0.045 of an inch. Moreover, approximately 9.0 percent of the silicon reacts with the graphite to form beta-silicon carbide, up to a depth of 0.015 of an inch and the film has an overall thickness of approximately 0.0075 of an inch.

It has been found that bridges coated in this manner give far superior results than bridges which were coated with elemental silicon at 1140° C. without fusing the silicon into the graphite. When elemental silicon was deposited on bridges and not fused, the films thus produced were poor, substantially pervious to gas and did not prevent contamination of wafers by the graphite heating element. Moreover, the commercial life of the bridges having unfused coatings of silicon was substantially shorter than where the coating of silicon was fused. It has been established by various tests that bridges coated and not fused with silicon were useful for approximately twelve commercial runs whereas bridges coated and fused with silicon had a useful life of approximately fifty runs. Moreover, bridges which were coated and fused with silicon had a film resistivity varying between 45 and 62 ohm centimeters, whereas bridges having a deposited layer of unfused silicon had film resistivities varying between 1 and 2 ohm centimeters.

Figure 3:
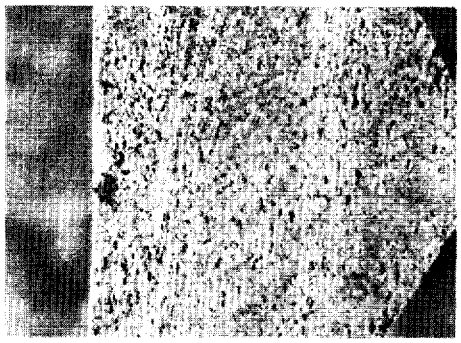
FIGURE 3 is a reproduction of an optical micrograph taken at fifteen times actual size of a sample from a graphite heating element.

The sample in the optical micrograph of FIGURE 3 was removed from a graphite heating element and polished before an electron-probe microanalysis was performed. The graphite heating element from which the sample of FIGURE 3 was removed was vacuum heated at 1140° C. for one-half hour in an epitaxial silicon furnace. Trichlorosilane and hydrogen gases were reacted at 1140° C. for fifteen minutes there following, to produce elemental silicon which was deposited on the surface of the heating element. The temperature was then raised to a temperature within the range of 1500–1550° C., where the silicon melted and diffused into the pores of the graphite and thence became bonded thereto. Some of the silicon reacted with the carbon atoms of the graphite forming beta-silicon carbide. Following this, trichlorosilane and hydrogen were again reacted for fifteen minutes at 1140° C. to produce an outer coating of elemental silicon. By reference to FIGURE 5, it can be seen that the silicon penetrated to a depth in the graphite of almost 200 microns. The light areas in the electron scattering image of FIGURE 4 indicate voids within the graphite and by comparing FIGURE 4 with the X-ray image of FIGURE 5, it can be seen that the silicon tended to fill these voids. Moreover, by reference to FIGURE 5, it can be seen that an almost impervious outer coating of silicon was formed on the outer surface of the sample and hence of the graphite heating element.

Figure 4:
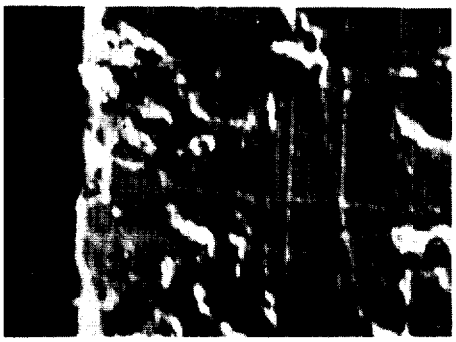
FIGURE 4 is a reproduction of an electron scattering image of sample of FIGURE 3, when the latter is provided with a silicon coating fused to the surface thereof.
Figure 5:
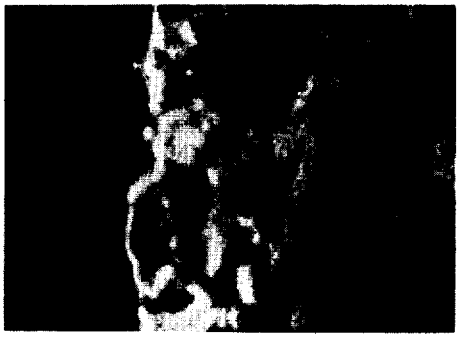
FIGURE 5 is a reproduction of an X-ray image of the sample of FIGURE 3 when the latter was provided with a silicon coating fused to the surface thereof.

The scattered electron image of FIGURE 4, the X-ray image of FIGURE 5 and the remainder of the scattered electron images and X-ray images appearing in FIGURES 6 thru 14 were performed on a scanning electron-probe X-ray microanalyzer. To obtain the scattered electron images, the electrons are back-scattered from the specimen and detected by a scintillation counter. The signal is used to form an image on a display tube which can be photographed. This scattered-electron image shows the topographical detail similar to an optical image by oblique elimination and is useful to identify the region which was scanned for subsequently producing the X-ray image. The X-ray images produced are magnified plots of the intensity of X-rays emitted from the specimen surface as the electron-probe scans through a raster pattern. The spectophotometer forming part of the electron-probe microanalyzer is normally set for a characteristic emission line of a chosen element so that the contrast in the X-ray image portrays the concentration distribution of that particular element. In the present case, the spectrophotometer is set to record the characteristic emission lines of silicon. All of the samples analyzed in the electron-probe microanalyzer were polished and then cleaned. The magnification used to produced the scattered electron images and the X-ray images were 200 times the actual size of the sample from which obtained. The electron-probe microanalyzer employed an argon-methane flow counter at 1934 volts used a minimum scanning line speed of 5 frames per second and X-ray contrast of 7.6 and a brightness of 0.8.

The graphite heating element used to produce the sample of FIGURES 6, 7 and 8 was vacuum heated in an epitaxial silicon furnace for 1½ hours at 1140° C. and coated with silicon for ½ hour at 1140° C. Again, the silicon coating was the reaction product of trichlorosilane and hydrogen gases which were reacted at this temperature to produce the elemental silicon deposited on the surface of the heating element. Inasmuch as the temperature was not raised to the melting point of silicon, the elemental silicon did not melt and therefore did not become bonded or fused to the graphite heating element. FIGURE 6 is a reproduction of the scattered electron image of the sample just described and showing the surface contour thereof. FIGURE 7 is a reproduction of an X-ray image of the sample which was used to produce the scattered electron image of FIGURE 6. FIGURE 8 is a background X-ray image of the area examined and discloses that some of the enhancement along the edge of the sample, is due to topographical effect. FIGURE 8, when visually compared with FIGURE 7, indicates that the concentration of silicon along the edge of the sample is not nearly as great as it appears to be by direct reference to FIGURE 7 alone. Much of this additional enhancement which appears in FIGURE 7 and, hence, which is the effect in FIGURE 8 is a result of the condition known as "white radiation." When comparing FIGURES 7 and 8, it can be seen that there is very little penetration into the pores of the graphite, when the silicon is not melted and bonded to the graphite as was the case with the sample of FIGURE 3. Moreover, it can be seen that the coating which actually adheres to the surface of the sample is rather light and somewhat gas pervious.

The graphite heating element from which the sample of FIGURE 9 was removed, was vacuum heated in an epitaxial silicon furnace for one-half hour at 1140° C. Trichlorosilane and hydrogen gases were then reacted at 1140° C. for fifteen minutes to produce a coating of elemental silicon on the surfaces of the heating element. Following this, the temperature of the heating element was raised to 1500–1550° C. where the silicon melted and penetrated into the pores of the graphite and became bonded thereto. Trichlorosilane gas and hydrogen were again reacted at 1140° C. for fifteen minutes to produce another coating of silicon. The heating element was raised to a temperature within the range of 1500–1550° C. for two minutes where the silicon melted and penetrated into the pores of the graphite. Following this, another coating of silicon was deposited at 1140° C. for one hour. Following this, the coating was fused at 1550° C. for two minutes and then followed by an additional coating of elemental silicon formed by the reaction of trichlorosilane and hydrogen at 1140° C. for one hour.

FIGURE 9 is a reproduction of an optical micrograph of this sample and illustrated thereon are fields 1, 2, 3 and 4 which were subsequently examined. FIGURE 10 is a scattered electron image of the field designated as 1 and shows the topography of the sample at this point. FIGURE 11 is an X-ray image of field 1 and discloses the heavy layer of silicon on the surface of the sample, and the lesser amounts of silicon which penetrated into the pores of the graphite. It can be seen, however, that the concentration of silicon within the pores of the graphite is much greater than the concentration in the sample of FIGURE 3 which is illustrated in the X-ray image of FIGURE 5. FIGURE 12 is a scattered electron image of fields 2, 3 and 4 of the sample in FIGURE 9. FIGURE 13 is an X-ray image of fields 2, 3 and 4. It can be seen, by reference to this figure, that the silicon penetrated into the pores of the graphite to a depth of almost 750 microns in great concentrations. FIGURE 14 is a background X-ray image of field 4 illustrating the amount of white effect "white-radiation" which appeared in the X-ray image of FIGURE 13. Consequently, visual comparison of field 4 in FIGURE 13 and FIGURE 14 would indicate the amount of silicon actually present in field 4. In effect, it can be seen, that beyond a depth of 700 microns, there is practically no silicon present.

The graph of FIGURE 33 discloses the amount of silicon penetration and silicon carbide formation when the heating element is provided with a silicon coating without being fused to the graphite. The graph of FIGURE 34 discloses the amount of silicon penetration and silicon carbide formation when the heating element is provided with a silicon coating which has been fused in accordance with the present invention. The data for the plot of FIGURE 33 was obtained from an X-ray diffraction analysis on the sample of FIGURE 6, where the silicon film was not fused to the surface of the graphite. The data was corrected for the difference in mass absorption coefficients between the components of the sample, that is to say, the data was corrected for the atomic scattering coefficients of silicon and carbon since these elements have a different ability to diffract, due to their difference in atomic weights. By reference to FIGURE 33, it can be seen that a coating of approximately 0.003 of an inch was formed on the exterior surface of the graphite. By further reference to this figure, it can be seen that the silicon penetrated the graphite to a depth of approximately .0015 for an inch and moreover, no silicon carbide formation was observed.

The data for the graph of FIGURE 34 was obtained from the sample of FIGURE 9, which was provided with a heavy coating of silicon bonded to the surface of the graphite. The data was also corrected for atomic scattering coefficient. It can be seen that a coating of approximately 0.0075 of an inch was formed on the exterior surface of the graphite. Moreover, approximately 9% of the silicon which penetrated the graphite was converted to silicon carbide up to a depth of approximately 0.017 of an inch and beyond that point, began to decrease. Moreover, it can be seen that elemental silicon penetrated the graphite to approximately 0.013 of an inch and X-ray diffraction analysis indicated a 9.0% quantity at this depth. X-ray diffraction analysis indicated a presence of approximately 2.0% silicon carbide up to the depth of 0.0335 of an inch. It can thus be seen that silicon carbide was present at a greater depth than elemental silicon.

The previously described method of conditioning the surfaces of carbonaceous resistance electric heaters has been found to be very suitable and to produce highly efficient results with heaters having a leg length of 24 to 36 inches and a leg width of approximately 1¼ inches. However, it has recently been found that it is possible to produce substantially larger heaters than those of the immediately described dimensions, such as the type described in my copending patent application Ser. No. 415,363, filed Dec. 2, 1964, now U.S. Patent No. 3,351,742. It has also been found that with heaters of the larger type, a more efficient gas impervious coating can be formed by the deposition of beta-silicon carbide directly upon the heater surface. In this preferred embodiment of the invention, the silicon carbide is produced independently of the graphite heater and is thereafter deposited in the form of fine crystals on the surface of the graphite heater.

Figure 1:
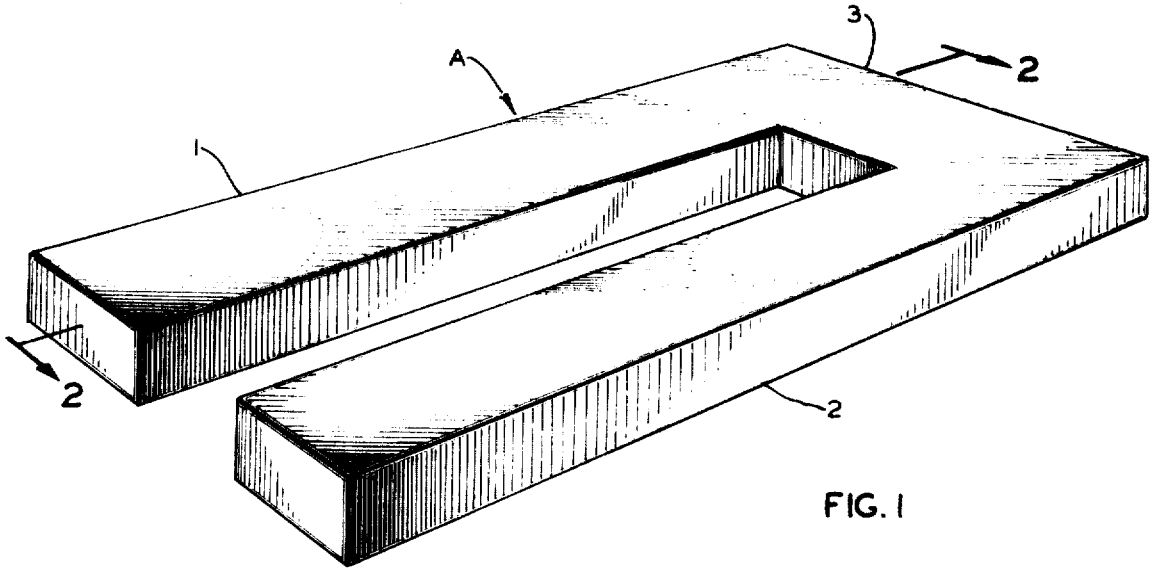
FIGURE 1 is a perspective view of a graphite heating element which has been surface treated in accordance with the present invention.
Figure 2:
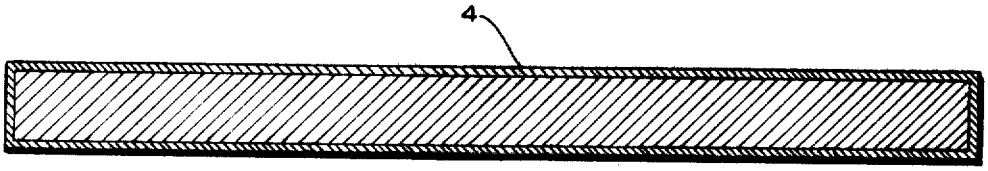
FIGURE 2 is a vertical sectional view taken along line 2—2 of FIGURE 1.

The graphite heater employed may be conventional in its construction and substantially identical to the previously described heater A illustrated in FIGURES 1 and 2 or it may be substantially identical to the type of graphite heater described in my copending patent application Ser. No. 415,363, filed Dec. 2, 1964. In order to produce the silicon carbide coating of the present embodiment, the heating element is suitably connected to the electrical contacts of an epitaxial silicon furnace (not shown), and enclosed within a gas-tight bell jar (also not shown). The silicon carbide coating is formed by the simultaneous reduction of trichlorosilane and chloroform by hydrogen according to the following reaction:

$$SiHCl_3+CHCl_3+2H_2 \rightarrow SiC+6HCl$$

In the normal process, the bell jar is evacuated and purged at atmospheric pressure with hydrogen prior to the coating process. Electrical current is then passed through the heater until the temperature thereof attains at least 1400° C. The preferred temperature range is from 1500 to 1550° C. Thereafter, gaseous trichlorosilane, chloroform and hydrogen are simultaneously admitted to the bell jar for approximately 50 minutes where silicon carbide is formed according to the above reaction. The silicon carbide thus formed is deposited on the graphite surfaces of the heating element, thereby forming a gas impervous substantially permanent silicon carbide layer, substantially similar to the coating 4 illustrated in FIGURE 2.

The resulting film has an average film thickness of approximately 0.010 of an inch. It has been found in connection with the present invention that the silicon carbide coating does not penetrate through the pores of the graphite heater in a considerable amount but forms a rather gas-tight impervious coating on the surface of the graphite.

In another embodiment of the present invention, it has been found that a very efficient gas impervious coating can be formed by a combination of the methods described in each of the aforementioned embodiments. For substantially large heating elements, an almost perfect gas-tight film can be formed by depositing a layer of silicon on the graphite heater by fusing the layer of silicon to the heater, depositing a layer of silicon carbide on the silicon surface, depositing a layer of silicon on the silicon carbide surface, and finally fusing the last layer of silicon to the heater.

More specifically, this last embodiment is performed by securing a heating element to the electrical contacts of an epitaxial silicon furnace (not shown) and enclosing the heater in a bell jar (also not shown). The graphite heater is then vacuum heated in the silicon furnace for approximately one-half hour at 1140° C. The bell jar may then be purged with hydrogen. Gaseous trichlorosilane and hydrogen are then reacted at 1140° C. for approximately 15 minutes to produce a coating of elemental silicon on the surface of the heating element. Following this, the temperature of the heating element is raised to a temperature within the range of 1500 to 1550° C. where the silicon is melted and penetrates into the pores of the graphite and becomes physically fused to the carbon atoms of the graphite. Again, as previously described, a small portion of the silicon deposited on the graphite heater will react with the carbon atoms to form beta-silicon carbide. Thereafter, the heater is maintained at a temperature within the range of 1500° to 1550° C. Gaseous trichlorosilane, chloroform and hydrogen are then admitted to the bell jar for approximately 50 minutes where silicon carbide is formed by the simultaneous reduction of the chloroform and trichlorosilane. The silicon carbide is then deposited on the graphite heater in the form of a fine crystalline structure. In connection with the deposition of the silicon carbide, it should be understood that the minimum temperature for the graphite heater is 1400° C. and deposition of the silicon carbide can be performed at any temperature above 1400° C. However inasmuch as the heater was previously maintained at a temperature within the range of 1500 to 1550° C., the heater is held within this temperature range.

Thereafter, a final coating of silicon is deposited upon the heater in accordance with the previously described method of the reduction of trichlorosilane. This deposition is also performed in an approximately fifteen-minute period. In connection with this last stage, the heater temperature may be lowered to 1140° C. for the deposition of silicon for approximately fifteen minutes, and thereafter raised to a temperature within the range of 1500 to 1550° C. for an additional fifteen minutes. It is also possible to continually maintain the temperature of the heater within the range of 1500 to 1550° C. after the deposition of silicon carbide without lowering the heater temperature for the deposition of the last coating of silicon.

As another modification of the present invention, the heating element can be essentially raised to 1500° C. to 1550° C. prior to deposition of the original silicon coating. After the temperature has been raised to approximately 1500 to 1550° C., a reduction of gaseous trichlorosilane will create a coating of silicon which is deposited on the heating element at this temperature. The bridge is constantly maintained at this temperature throughout the entire coating process inasmuch as this temperature is above the melting point of silicon. The silicon which is deposited on the heating element immediately melts, diffuses into the graphite and becomes fused thereto. Thereafter, the silicon carbide is deposited on the heating element by the simultaneous reduction of trichlorosilane and chloroform. After the silicon carbide coating, silicon is again deposited by the reduction of trichlorosilane. This last layer of silicon will again be diffused into the pores of the graphite and become fused thereto.

It has been found in certain cases that it is possible to dispense with the last coating of silicon. In other words, the bridge is only provided with a coating of silicon which is fused to the bridge and which is followed by a coating of silicon carbide. In similar manner, it has been found that in certain cases, it is possible to originally coat the bridge with silicon carbide, to be followed by a single coating of silicon which is fused to the bridge. In each of these later named methods, the silicon is, of course, produced by the reduction of trichlorosilane and the silicon carbide is produced by the simultaneous reduction of trichlorosilane and chloroform. However, these latter two methods which dispense with the second coating of silicon are only useful in limited cases and do not show the degree of imperviousness attained when the bridge is provided with a fused silicon coating, a silicon carbide coating and a fused silicon coating.

In order to observe the degree of penetration and formation of the silicon carbide formed by the simultaneous reduction of trichlorosilane and chloroform various samples were produced and analyzed by an X-ray spectrographic analysis. The samples, however, were analyzed on the basis of a silicon standard. Accordingly, a sample of pure silicon having purity of at least 99.9% was analyzed to obtain a slow scan concentration profile. FIGURE 15 illustrates a reproduction of the electron scattering image of the pure silicon sample giving an indication of surface contour. This topographical detail obtained by FIGURE 14 is similar to an optical image obtained by oblique elimination and serves to identify the region which was scanned for subsequently producing the X-ray image of the pure silicon sample. The X-ray images are again produced by magnified pilots of the intensity of X-rays emitted from the specimen surface as the electron-probe scans through a raster pattern. In this particular case, a Cambridge Instrument Company, Ltd. X-ray scanning microanalyzer No. 961,119 was employed. The spectrophotometer which formed part of the electron-prob microanalyzer was set for at characteristic emission line of silicon. The microanalysis employed a gypsum crystal using an electrode beam angle of 27.67° A phase height analyzer was employed with a threshold height of 17 centimeters and a gate width of 10 centimeters. The gas flow counter was maintained at .90 volts and the scintillation counter at 1.10 volts. The photographs showing the X-ray patterns were obtained at a 200 second exposure using a probe current of 0.3 microampere. All slow scans were obtained at 1,000 counts per second.

The X-ray pattern for the pure silicon sample is shown in FIGURE 14 and the background sample illustrating the enhancement or so-called "white radiation" is shown in FIGURE 17. A pattern was measured in FIGURE 16 for selected areas and 122,000 counts were obtained as compared to an identical pattern producing 6,200 counts in FIGURE 17. This indicates that no more than 5% of white radiation appears in the X-ray image of FIGURE 16. FIGURE 18 illustrates the slow scan concentration profile for silicon, the background concentration and the base line. This figure provides the standard for samples which are analyzed and described hereinbelow.

FIGURE 19 is a reproduction of an optical micrograph taken at 20 times the actual size of a sample removed from a graphite heating element which was provided with a silicon carbide coating formed in accordance with the present invention. The graphite heating element from which the sample of FIGURE 19 was removed was of the double taper type described in my copending application Ser. No. 415,363, filed Dec. 2, 1964. The heating element had a length of approximately 24 inches, a width of about 3 9/16 inches and an overall thickness of approximately ¼ inch. The legs taper from an overall thickness of 0.260 of an inch at the center to 0.230 of an inch at a point proximate to its transverse ends. The heating element was then secured to the electrical contacts of an epitaxial silicon furnace and purged at 50 microns for about 30 minutes. Thereafter, the bell jar in which the heating element was disposed was purged with hydrogen at 28" of mercury pressure for about 10 minutes. The bell jar was then brought up to atmospheric pressure and purged at atmospheric pressure for about fifteen minutes with hydrogen. Thereafter, the heating element was heated to a temperature of about 1600° C. in an amosphere of pure hydrogen which was set at about 33 liters per minute. Trichlorosilane was then added at a rate of 2.03 grams per minute, followed by the addition of chloroform at the rate of 0.83 gram per minute for approximately 90 minutes. An apparent temperature drop was observed when the trichlorosilane and chloroform gases were added. The temperature dropped to approximately 1525° C. After completion of the feed gases, an olive drab velvet-like microcrystalline coating was determined to be about 0.011 of an inch thick. The heating element was cut across the narrow dimension and studied by a microbeam X-ray analysis.

FIGURE 20 is the reproduction of the electron scattering image of the sample of FIGURE 19 and describes the topographical detail which is useful for identifying the region scanned to produce the X-ray image of FIGURE 21. Referring to FIGURE 21, it can be seen that a coating of approximately 60 microns was obtained by the above method. FIGURE 22 illustrates the amount of enhancement or background radiation which appears in the X-ray spectrographic analysis of FIGURE 21. However, it can be seen that the amount of enhancement is very small and almost the entire coating in FIGURE 21 is a result of the silicon carbide formation.

FIGURE 23 illustrates the slow scan concentration profile for silicon, for the background and for the base line. This profile, when compared with the standard profile of FIGURE 18, provides a general picture of the type of coating achieved and an indication of the amount of silicon carbide present. This can be accomplished by relating the peak height of the profile pattern to the peak height of the background image, with reference to the base line.

Referring again to the standard profile of FIGURE 18, it can be seen that the average peak height was found at a distance of approximately 52 millimeters from the base line. The average background line was formed at a height of approximately 2 millimeters from the base line. Subtracting the background average peak from the profile average peak, provides a standard measurement of approximately 50 millimeters for 100 percent pure silicon. On this basis, a 1 millimeter measurement on a profile pattern accounts for 2 percent silicon. Relating this basic measurement to the profile pattern of FIGURE 23, it can be seen that the average peak height measurement on FIGURE 23 was approximately 45 millimeters from the base line. The average peak of the background was approximately 2 millimeters rendering a true peak measurement of 43 millimeters. Relating this measurement to the standard of FIGURE 18, it can be seen that approximately 86 percent silicon was present. In actuality, this figure is approximately 16 percent high in that it is estimated that approximately 16 percent of the radiation was not indicated on the pattern due to self-absorption and matrix correction. This 16 percent correction factor, reduced from 80 percent silicon provides a silicon reading of approximately 70 percent. A 70 percent silicon reading on an X-ray probe analysis which was designed to measure silicon indicates approximately a 100 percent silicon carbide formation. This can be determined by a simple molecular weight relationship. The molecular weight of silicon is 28 and the molecular weight of carbon is 12 providing a total molecular weight of silicon carbide at 40. Twenty-eight over forty (28/40)=70 percent silicon and twelve over forty (12/40)=30 percent carbon or 100 percent silicon carbide. This determination of a 100 percent silicon carbide coating was also confirmed by an X-ray diffraction analysis.

An X-ray probe analysis was also made on a graphite heating element in FIGURE 24 similar to the heating element illustrated in FIGURE 19. The heating element was of the double taper type and the dimensions were the same as the dimensions of the heating element from which the sample of FIGURE 19 was removed. However, the bridge from which the sample of FIGURE 24 was removed was used in approximately 15 commercial applications for producing epitaxial silicon wafers; whereas the sample removed from the bridge of FIGURE 19 was not used in any commercial application. The heating element was secured to the contacts of an epitaxial silicon furnace and purged at approximately 200 microns pressure for about 30 minutes. Thereafter, the heating element was heated to approximately 1600° C. in an atmosphere of hydrogen which was admitted to the bell jar at a rate of about 33 liters per minute. Trichlorosilane was then added at a rate of 2.03 grams per minute followed by the addition of chloroform at a rate of 0.83 gram per minute. The gases were admitted to the bell jar for a period of approximately 90 minutes. The temperature was thereafter dropped to 1525° C. A microcrystalline silicon carbide coating was observed and the heating element was cut across the narrow dimension and analyzed by a microbeam X-ray analysis. However, in this case the sample of FIGURE 24 was removed from an area which was always covered by a wafer in a commercial application. Consequently, this area was not affected by additional deposition of silicon on the heating element in commercial operations. The scattered electron image of FIGURE 25 shows the topographical detail of the sample of FIGURE 24 which is used to identify the region scanned for producing the X-ray image of FIGURE 26. The scanning line used to produce the 5-ray image of FIGURE 26 is also illustrated as the horizontal line in the electron scattering image of FIGURE 25. FIGURE 27 illustrates the amount of enhancement or background radiation which is present in the X-ray image of FIGURE 26. Again, it can be seen this enhancement is very slight and that the coating appearing in FIGURE 27 is almost a pure silicon carbide coating. However, it can be observed that after commerical use, some of the silicon carbide on the surface coating penetrated into the pores of the graphite heating element. In fact, the penetration occurred to a depth of at least 104 microns.

FIGURE 28 represents the slow scan concentration profile for silicon, the background concentration and base line of the sample of FIGURE 24. By reference to FIGURE 28, it can be seen that the measurement of the average profile peak with respect to the base line produced a distance of 41 millimeters. Measurement of the average peak background with respect to the base line produced a distance of 1 millimeter. The true average profile peak is, therefore, 40 millimeters. By referring to the standard profile pattern of FIGURE 18, it can be seen that approximately 80 percent silicon carbide was present. By a reduction of the correction factor of 16 percent, it is therefore determined that approximately 94 percent of the coating was silicon carbide.

FIGURE 29 is a reproduction of an optical micrograph at 20 times magnification, of a sample removed from a graphite heating element which was coated with silicon, silicon carbide and an additional coating of silicon. This sample was produced for ultimate spectrographic analysis, the details of which are set forth below. The heating element from which the sample of FIGURE 29 was removed was of the double taper type, previously described. The heating element had a length of approximately 24 inches and an overall width of approximately 5⅜ inches. The legs had a thickness of approximately ¼ inch. The heating element was fabricated from graphite U–120 of the Ultra Carbon Corporation of Bay City, Mich. In order to coat the heating element, the latter was clamped to the electrode of an epitaxial silicon furnace and covered by a quartz bell jar. The bell jar was then purged at 50 microns pressure for about 30 minutes. Thereafter, the bell jar was purged with hydrogen with a pressure at 28″ of mercury for approximately 10 minutes. The bell jar was then brought up to atmospheric pressure where it was purged for approximately 15 minutes. Thereafter, the heating element was raised in temperature to approximately 1635° C. by regulation of alternating current. The hydrogen flow rate was then increased to about 30 liters per minute.

As previously mentioned, the following steps were used to produce the coating on the sample disclosed in the micrograph of FIGURE 29. Initially, a coating of silicon was deposited on the surface of the sample; the coating of silicon was fused by raising the temperature of the sample above the melting point of silicon; a coating of silicon carbide was deposited thereon; and a final coating of silicon was deposited thereafter. Again, the latter coating of silicon was fused by raising the temperature to a point above the melting point of silicon. In more detail, trichlorosilane was fed into the bell jar at a rate of approximately 2.2 grams per minute for approximately 10 minutes. Trichlorosilane was reduced in the presence of hydrogen thereby depositing a coating of silicon on the graphite heater. Thereafter, chloroform was fed at the rate of 0.3 gram per minute for approximately 10 minutes. The chloroform feed rate was then increased to 1.92 grams per minute and was maintained at this rate for approximately 55 minutes. The temperature of the heating element during this entire period was maintained at about approximately 1600° C. Thereafter, the temperature of the heating element was reduced to approximately 1275° C. At this point, the chloroform feed gas was shut off and trichlorosilane was added at a rate of 2.03 grams per minute for approximately 15 minutes. The temperature of the heating element was then reduced to slightly above the melting point of silicon. The temperature was again lowered to approximately 1275° C. and trichlorosilane was again fed at the rate of 2.03 grams per minute for approximately 20 minutes. The temperature was then increased until it was just above the melting point of silicon causing the silicon deposited on the layer of the graphite heater to diffuse into the pores thereof. The heating element was then cut by a diamond edged saw for study of film depth and silicon carbide formation.

FIGURE 30 is a scattered electron image of the sample of FIGURE 29, and shows the topographical detail which is used to identify the region for producing the X-ray image of FIGURE 31. Moreover, the scanning line which was used in the microanalyzer to produce the X-ray photograph of FIGURE 31 is illustrated in the scattered electron image of FIGURE 30. By reference to FIGURE 31, it can be seen that a relatively thick gas impervious coating having an overall average thickness of approximately 60 microns was formed by the above procedure. Moreover, it can be seen that penetration of the silicon and silicon carbide took place to a rather extreme depth. A background X-ray image for the X-ray image in FIGURE 31 was not produced inasmuch as slow scanning on the X-ray probe microanalysis disclosed a very negligible amount of "white-radiation." Accordingly it can be determined that the entire coating illustrated in FIGURE 31 consists substantially of silicon and silicon carbide. The X-ray image was produced at approximately 22,500 counts for approximately 200 seconds and as previously mentioned the background image was negligible.

FIGURE 32 illustrates a slow scan concentration profile showing silicon concentration, background concentration and base line for the sample of FIGURE 29. By reference to FIGURE 32 alone, it can be seen that the background radiation is substantially small relative to the overall profile of the coating on the heating element itself. By further reference to FIGURE 32, it can also be seen that the average peak height measurement of the profile was approximately 44 millimeters with respect to the base line, and that the background image had an average peak height of 1½ millimeters with respect to the base line. The true average peak height, therefore, was approximately 42½ millimeters. Referring to the standard X-ray profile of FIGURE 18, it can be seen that approximately 85 percent silicon is present by means of the calculation previously described. Again, with the correction factor this would indicate a 70 percent silicon concentration for approximately 100 percent silicon carbide. By further reference to FIGURE 32, it can be seen that pentration of the coating was obtained up to a depth of approximately 140 microns, but the substantially thick heavy coating was obtained only with a thickness of approximately 100 microns.

The above X-ray probe analysis pictorially illustrates the result of applying both silicon and silicon carbide and discloses a typical coating on the form of the bridge. It can be seen from the preceding analyses that a coating of silicon deposited on the bridge tended to diffuse into the pores of the graphite and become fused thereto. It was also evident that a portion of the silicon reacted with the carbon atoms in the graphite to form some beta-silicon carbide. Nevertheless, this beta-silicon carbide was fused into the pores of the graphite. It can be seen that an application of pure beta-silicon carbide which is formed externally of the bridge is only deposited on the bridge and does not diffuse into the pores of the graphite. This is evidenced by reference to FIGURES 31 and 32. Thus, when an original coating of silicon is deposited on the bridge and the bridge is heated to a temperature above the melting point of silicon, the silicon will diffuse into the graphite and become fused thereto. Thereafter, a layer of silicon carbide deposited on the bridge will remain on the surface as a true surface coating with little or no penetration. While the silicon carbide coating itself is gas impervious, it is of a somewhat granular structure. Accordingly, an additional coating of silicon deposited thereon will diffuse into the silicon carbide and perhaps diffuse into the graphite itself. This explanation accounts for the fact that the profile scan of FIGURE 32 discloses only beta-silicon carbide. Actually, silicon is present but only in small quantities and it is thoroughly diffused into the beta-silicon carbide coating.

EXAMPLES

The invention is further illustrated by, but not limited to, the following examples:

EXAMPLE 1

This example illustrates a typical operation according to the prior art for producing and utilizing silicon-coated graphite bridges. A graphite heating element of ultra pure graphite was used in an actual operation for producing epitaxial silicon films on silicon wafers. The heating element was of the standard form normally used in epitaxial furnaces, and was generally U-shaped in horizontal cross section. Each of the legs had a length of 12 inches and were connected by a bridge of 3 9/16 inches. Each of the legs had a width of 1 3/8 inches and a thickness of 1/4 inch. The heating element was suitably positioned in an epitaxial silicon furnace, cleaned, and the furnace was evacuated to approximately 15 microns mercury pressure for approximately 30 minutes. The furnace was then purged to 2 lbs. per square inch absolute pressure. Hydrogen was then added for approximately 10 minutes while maintaining the pressure in the furnace at 2 lbs. per square inch absolute pressure. Following this, the furnace was purged for an additional 30 minutes by adding hydrogen at the rate of 18 liters per minute at atmospheric pressure.

The heating element was provided with a silicon coating by passing trichlorosilane gas into the furnace area at a rate of 0.54 g. per minute and hydrogen at a rate of 14 liters per minute, while maintaining the heating element at a temperature of 1180° C. The power supplied to the heating element was alternating electrical current having 485 amperes and 23.9 volts. The coated heating element was then cooled to room temperature and charged with 16 silicon wafers which were polished on the (111) plane, Miller's indices. The above mixture of hydrogen and trichlorosilane gases were passed into the furnace while the heating element was maintained at a temperature of 1180° C.

The epitaxial silicon layers thus formed on the wafers had a poor quality due to the development of surface imperfections on the wafers. The surface imperfections were attributed to the evolution of gases from the graphite heating element. By reference to the following table, the wafer deposition temperature can be seen as a function of the distance from the furnace electrodes. Moreover, the film resistivity and average film thickness can be seen.

| Distance from Electrode | Wafer Deposition Temperature | Film Resistivity (ohm-cm.) | Film Thickness (mils) |
|---|---|---|---|
| 3 | 1,120 | 01.65 | 0.77 |
| 4 | 1,120 | 01.65 | 0.71 |
| 5 | 1,120 | 01.65 | 0.68 |
| 6 | 1,120 | 01.65 | 0.70 |
| 7 | 1,154 | 01.65 | 0.74 |
| 8 | 1,154 | 01.65 | 0.92 |
| 9 | 1,154 | 01.65 | 1.00 |
| 10 | 1,160 | 01.65 | 0.95 |
| 10 | 1,160 | 01.65 | 0.85 |
| 9 | 1,167 | 01.65 | 0.77 |
| 8 | 1,167 | 01.65 | 0.74 |
| 7 | 1,152 | 01.65 | 0.70 |
| 6 | 1,152 | 01.65 | 0.68 |
| 5 | 1,152 | 01.65 | 0.73 |
| 4 | 1,152 | 01.55 | 1.22 |
| 3 | 1,125 | 01.75 | 1.18 |

EXAMPLE 2

The graphite heating element used in Example 1 was mounted in the same epitaxial silicon furnace. The furnace was evacuated and the heating element was maintained at a temperature of 1180° C. in an attempt to cause additional outgassing of the heating element and thereby possibly eliminate some of the impurities contained therein. The procedure of Example 1 was then repeated and the heating element was charged with 16 additional wafers which were also high polished on the (111) plane, Miller's indices. The epitaxial layers formed on the wafers had a poor quality and exhibited considerable cloudiness. The results of the experiment can be seen in the following table:

| Distance from Electrode | Wafer Deposition Temperature | Film Resistivity (ohm-cm.) | Film Thickness (mils) |
|---|---|---|---|
| 3 | 1,105 | 01.65 | 0.77 |
| 4 | 1,105 | 01.65 | 0.71 |
| 5 | 1,105 | 01.65 | 0.68 |
| 6 | 1,105 | 01.65 | 0.70 |
| 7 | 1,150 | 01.65 | 0.74 |
| 8 | 1,150 | 01.65 | 0.92 |
| 9 | 1,150 | 01.65 | 1.00 |
| 10 | 1,150 | 01.65 | 0.95 |
| 10 | 1,147 | 01.65 | 0.85 |
| 9 | 1,147 | 01.65 | 0.77 |
| 8 | 1,147 | 01.65 | 0.74 |
| 7 | 1,148 | 01.65 | 0.70 |
| 6 | 1,148 | 01.65 | 0.68 |
| 5 | 1,148 | 01.65 | 0.73 |
| 4 | 1,148 | 01.55 | 1.22 |
| 3 | 1,120 | 01.75 | 1.18 |

EXAMPLE 3

Due to the unsatisfactory results produced in Examples 1 and 2, the heating element employed therein was returned to the manufacturer (Ultra Carbon Products Company of Bay City, Mich.) for repurification. The repurified heating element was then mounted in the same epitaxial silicon furnace where the furnace was evacuated for 20 minutes to 39 microns mercury pressure. The furnace was then purged by the addition of hydrogen for 10 minutes while maintaining the pressure at 2 lbs. per square inch absolute pressure. The furnace was further purged by adding hydrogen at a rate of 50 liters per minute for 15 minutes at atmospheric pressure. The bridge was similarly provided with a silicon coating by passing trichlorosilane into the furnace at a rate of 42 liters per minute and hydrogen at a rate of 0.54 gram per minute while maintaining the heating element at a temperature of 1180° C. The heating element when cooled, was charged with 12 highly polished silicon wafers and heated to 1150° C. Trichlorosilane was passed into the furnace area at a rate of 42 liters per minute and hydrogen was passed into the furnace simultaneously therewith at a rate of 0.54 gram per minute, for 75 minutes.

The epitaxial films thus produced exhibited a poor quality, again owing to the development of surface imperfections. The surface imperfections were similarly attributed to the evolution of gases from the heating element. The results achieved were similar to the results as illustrated in Examples 1 and 2.

The following examples are illustrative of the present invention and show the superior benefits of this invention over the prior art processes.

EXAMPLE 4

A heating element of the same design as the heating elements in Examples 1, 2 and 3 was mounted in a similar type of epitaxial silicon furnace and the preparatory procedure performed in Examples 1, 2 and 3 was followed herein. However, after originally coating the heating element with a film of silicon, the temperature of the heating element was increased to 1550° C. for 2 minutes, thereby melting the silicon and causing the latter to diffuse into the pores of the heating element. Trichlorosilane and hydrogen gases were then passed into the furnace, reacted and deposited on the heating element an additional film of silicon for 15 minutes, while maintaining a heating element temperature of 1150° C. The temperature of the heating element was then increased to 1550° C. for 2 minutes and the temperature again reduced to 1150° C. At this temperature, an additional layer of silicon was formed by the reaction of trichlorosilane and hydrogen for 90 minutes.

Thereafter, 38 silicon wafers were charged on the heating element, the above mentioned mixtures of gases passed into the furnace for 41 minutes and a coating of silicon was deposited on the wafers at a temperature of 1150° C.

The films thus produced were of good quantity and displayed no cloudiness or haze. The experimental data can be seen in the following table.

| Distance from electrode | Film Resistivity (ohm-cm.) | Film Thickness (mils) |
|---|---|---|
| 4 | 1.74 | .63 |
| 5 | 1.56 | .64 |
| 6 | 1.65 | .64 |
| 7 | 1.75 | .63 |
| 8 | 1.40 | .60 |
| 9 | 1.23 | .59 |
| 10 | 1.60 | .64 |
| 11 | 2.12 | .63 |
| 12 | 1.10 | .64 |
| 13 | 1.18 | .63 |
| 14 | 1.49 | .77 |
| 15 | 1.42 | .79 |
| 16 | 1.49 | .78 |
| 17 | 1.61 | .79 |
| 18 | 2.06 | .89 |
| 19 | 4.19 | .82 |
| 20 | .77 | .80 |
| 21 | .94 | .68 |
| 21 | 1.44 | .77 |
| 20 | 1.47 | .77 |
| 19 | 1.45 | .79 |
| 18 | 1.51 | .82 |
| 17 | 1.84 | .84 |
| 16 | 2.06 | .82 |
| 15 | 1.34 | .79 |
| 14 | 1.36 | .70 |
| 13 | 1.32 | .72 |
| 12 | 1.18 | .60 |
| 11 | 1.32 | .59 |
| 10 | 1.29 | .62 |
| 9 | 1.38 | .60 |
| 8 | 1.37 | .56 |
| 7 | 1.50 | .60 |
| 6 | 1.52 | .62 |
| 5 | 1.47 | .62 |
| 4 | 1.68 | .60 |
| 3 | 1.52 | .63 |
| 3 | 1.35 | .59 |

EXAMPLE 5

The heating element employed in Example 4 was provided with an additional film coating of silicon in order to determine the effect upon the wafers. This heating element was similarly mounted in an epitaxial silicon furnace and after the necessary preparatory procedures were performed, trichlorosilane and hydrogen gases were passed into the furnace at a rate of 0.54 gram per minutes and 14 liters per minute, respectively, at 1150° C. The temperature of the bridge was increased to 1550° C. for 2 minutes with the layer of silicon thus deposited, causing the silicon to melt and penetrate the pores of the graphite. The temperature was reduced to 1150° C. where the trichlorosilane and hydrogen gases were passed into the furnace, reacted and caused an additional layer of silicon to be deposited on the graphite heating element for one hour. The heating element was then increased in temperature to 1550° C. for 2 minutes, where the silicon thus deposited was fused to the graphic. The bridge was then coated for an additional one hour at 1150° C. and the silicon thus deposited was fused at 1550° C. for 2 minutes. Following this, an additional coating of silicon was deposited on the heating element for one hour at 1150° C.

Twelve highly polished wafers were charged on the heating element where a silicon film was deposited on the wafers at a temperature of 1140° C. for 42 minutes. The films thus produced has a good quality, and exhibited very little surface imperfections. The condition of the films can be seen from the following table.

| Distance from electrodes (inches) | Film Resistivity (ohm-cm.) | Average film thickness ($0.001^2$) |
|---|---|---|
| 5 | 61.8 | 0.60 |
| 6 | 57.5 | 0.64 |
| 10 | 57.0 | 0.84 |
| 14 | 47.9 | 0.71 |
| 20 | 50.7 | 0.79 |
| 21 | 53.1 | 0.81 |
| 21 | 50.2 | 0.77 |
| 20 | 45.9 | 0.71 |
| 14 | 53.2 | 0.63 |
| 10 | 54.6 | 0.64 |
| 6 | 55.4 | 0.66 |
| 5 | 55.1 | 0.59 |

The higher average film resistivity produced in the samples of Example 5 when compared with the samples of Example 4 shows the substantially reduced contamination level. X-ray diffraction analysis of the heating elements employed in Examples 4 and 5 disclosed the formation of a considerable amount of beta-silicon carbide.

EXAMPLE 6

The following example describes the procedure involved in the preparation of a coating consisting of alternating layers of silicon and silicon carbide. In this particular procedure, more than two silicon coatings and more than one silicon carbide coating was deposited on the surface of the bridge.

A graphite heating element of the double taper type with an overall length of approximately 24 inches, a width of approximately 5½ inches and an overall leg thickness of ¼ inch was mounted in an epitaxial silicon furnace. The legs forming part of the heating element had a taper from an overall thickness of 0.260 of an inch at the center portion of 0.230 of an inch at points proximate to their transverse ends. The heating element was then secured to the electrical contacts of an epitaxial silicon furnace and purged at approximately 50 microns pressure for about 30 minutes. Thereafter, the heating element was purged with hydrogen at a pressure of 28" of mercury pressure for approximately 10 minutes. The hydrogen feed was maintained at a flow rate of about 35 liters per minute. The pressure was then raised to atmospheric pressure and purged for approximately 15 minutes. The heating element was then increased to 1250° C.

After the 1250° C. temperature had been attained, trichlorosilane was added at a rate of 2.28 grams per minute for approximately 10 minutes. A temperature drop to 1175° C. was noted. Thereafter, the temperature of the heating element was raised to 1525° C. for approximately 2 minutes causing the silicon deposited on the bridge to fuse into the bridge. Following this, trichlorosilane was added at the rate of 2.28 grams per minute simultaneously with chloroform at the rate of 1.47 grams per minute for approximately 10 minutes. During this time, the temperature of the bridge was maintained at 1525° C. The trichlorosilane and chloroform were simultaneously reduced by the presence of hydrogen forming a beta-silicon carbide coating on the bridge.

Thereafter, trichlorosilane was again added at a rate of 2.38 grams per minute for approximately 10 minutes while the bridge was maintained at 1525° C. This created a coating of silicon which was immediately fused into the pores of the graphite heating element. This alternative procedure was then performed three additional times, where the bridge received three additional coatings of beta-silicon carbide and three additional coatings of silicon, the latter being deposited at a temperature of 1525° C. where it immediately fused and diffused into the pores of the graphite.

Thereafter, hydrogen was added at a rate of 29 liters per minute for approximately 5 minutes and the bridge was lowered to a temperature of 1175° C. Finally, the power to the bridge was disconnected permitting the bridge to cool to room temperature where it was purged with nitrogen for approximately 5 minutes.

The final bridge produced substantially good results when used in commercial applications, and moreover, very slight amount of outgassing was noted in any subsequent commercial operation.

It should be understood that changes and modifications in the form, construction, arrangement and combination of the parts presently described and pointed out could be made and substituted for those herein shown without departing from the nature of my invention.

Having thus described my invention what I desire to claim and secure by Letters Patent is:

1. The method of coating a carbonaceous article with a gas impervious coating, said method comprising vapor depositing a first coating comprising silicon on [the heating element] *said article,* causing the first coating to be fused to the [heating element] *article,* and vapor depositing a second coating comprising silicon carbide onto the first coating.

2. The method of applying a gas impervious coating to heating elements, said method comprising vapor depositing a first coating comprising silicon on the heating element, causing the first coating to be fused to the heating element, and vapor depositing a second coating comprising silicon carbide onto the first coating.

3. The method of treating resistance heating elements and the like formed of carbonaceous resistance material, said method comprising vapor depositing a first coating comprising silicon on the heating element, causing [a] *said* first coating to be fused to the heating element, and vapor depositing a second coating comprising silicon carbide onto the first coating.

4. The method of treating resistance heating elements and the like formed of carbonaceous resistance material, said method comprising vapor depositing a first coating comprising silicon on the heating element, vapor depositing a second coating comprising silicon carbide onto the first coating, and vapor depositing a third coating comprising silicon onto the second coating.

5. The method of coating a carbonaceous article with a gas impervious coating, said method comprising vapor depositing a first coating comprising silicon on [the heating element] *said article,* causing the first coating of silicon to be fused to the [heating element] *article,* vapor depositing a second coating comprising silicon carbide onto the first coating, vapor depositing a third coating comprising silicon onto the second coating, and causing the third coating comprising silicon to be fused to the [heating element] *article.*

6. The method of applying a gas impervious coating to heating elements, said method comprising vapor depositing a first coating comprising silicon on the heating element, causing the first coating of silicon to be fused to the heating element, vapor depositing a second coating comprising silicon carbide onto the first coating, vapor depositing a third coating comprising silicon onto the second coating, and causing the third coating comprising silicon to be fused to the heating element.

7. The method of treating resistance heating elements formed of carbonaceous resistance material, said method comprising vapor depositing a first coating comprising silicon on the heating element, causing the first coating of silicon to be fused to the heating element, vapor depositing a second coating comprising silicon carbide onto the first coating, vapor depositing a third coating comprising silicon onto the second coating, and causing the third coating comprising silicon to be fused to the heating element.

8. The method of treating resistance heating elements formed of carbonaceous resistance material, said method comprising vapor depositing a layer of elemental silicon on the heating element at a temperature below the melting point of silicon, increasing the temperature of the heating element to a temperature within the range of 1400° to 2000° C. causing the silicon to melt and diffuse into a partion of the graphite, vapor depositing a layer of silicon carbide on the layer of elemental silicon at a temperature of at least 1400° C., and vapor depositing elemental silicon on the layer of silicon carbide at a temperature within the range of 1400° to 2000° C. causing the silicon to melt and diffuse into a portion of the graphite.

9. The method of treating resistance heating elements formed of carbonaceous resistance material, said method comprising vapor depositing a layer of elemental silicon on the heating element at a temperature below the melting point of silicon, increasing the temperature of the heating element to a temperature within the range of 1500° to 1550° C. causing the silicon to melt and diffuse into a portion of the graphite, vapor depositing a layer of silicon carbide on the layer of elemental silicon at a temperature of at least 1400° C., and vapor depositing elemental silicon on the layer of silicon carbide at a temperature within the range of 1500° to 1550° C., causing the silicon to melt and diffuse into a portion of the graphite.

10. The method of treating resistance heating elements formed of carbonaceous resistance material, said method comprising vapor depositing a layer of elemental silicon on the heating element at a temperature below the melting point of silicon, increasing the temperature of the heating element to a temperature within the range of 1400° to 2000° C. causing the silicon to melt and diffuse into a portion of the graphite, vapor depositing a layer of silicon carbide on the layer of elemental silicon at a temperature of at least 1400° C., lowering the temperature of the heating element to a temperature below the melting point of silicon, vapor depositing elemental silicon on the layer of silicon carbide at said last named temperature, and increasing the temperature of the heating element to a temperature within the range of 1400° to 2000° C., causing the silicon to melt and diffuse into a portion of the graphite.

11. The method of treating resistance heating elements formed of carbonaceous resistance material, said method comprising vapor depositing a layer of elemental silicon on the heating element at a temperature below the melting point of silicon, increasing the temperature of the heating element to a temperature within the range of 1500° to 1550° C. causing the silicon to melt and diffuse into a portion of the graphite, vapor depositing a layer of silicon carbide on the layer of elemental silicon at a temperature of at least 1400° C., lowering the temperature of the heating element to a temperature below the melting point of the silicon, vapor depositing elemental silicon on the layer of silicon carbide at said last named temperature, and increasing the temperature of the heating element to a temperature within the range of 1500° to 1550° C. causing the silicon to melt and diffuse into a portion of the graphite.

12. The method of treating resistance heating elements formed of carbonaceous resistance material, said method comprising vapor depositing a layer of elemental silicon formed by the reduction of trichlorosilane on the heating element at a temperature below the melting point of silicon, increasing the temperature of the heating element to a temperature within the range of 1500° to 1550° C. causing the silicon to melt and diffuse into a portion of the graphite, vapor depositing a layer of silicon carbide formed by the simultaneous reduction of trichlorosilane and chloroform on the layer of silicon at a temperature of at least 1400° C., lowering the temperature of the heating element to a temperature below the melting point of silicon, vapor depositing elemental silicon formed by the reduction of trichlorosilane on the layer of silicon carbide at said last named temperature, and increasing the temperature of the heating element to a temperature within the range of 1500° to 1550° C. causing the silicon to melt and diffuse into a portion of the graphite.

13. A heating element formed of carbonaceous resistance material for epitaxial deposition furnaces and the like, said heating element having a uniformly distributed gas impervious coating vapor deposited thereon and being fused thereto, said coating comprising a first coating layer of vapor deposited silicon fused to the surface of the heating element with the silicon atoms intimately bonded to the surface of the heating element, said coating layer of granular silicon carbide vapor deposited on the first coating layer of silicon, thereby forming said gas impervious coating with vapor deposited silicon carbide intimately dispersed throughout the interstices of the silicon and where the silicon atoms become intimately bonded to the silicon carbide granules in an interlocking structure.

14. An article formed of carbonaceous resistance material said article having a uniformly distributed gas impervious coating vapor deposited thereon and being fused thereto, said coating comprising a first coating layer of vapor deposited silicon fused to the surface of the article with the silicon atoms intimately bonded to the surface of [the heating element] *said article,* said coating having a second coating layer of granular silicon carbide vapor deposited on the first coating layer of silicon, thereby forming said gas impervious coating with vapor deposited silicon carbide intimately dispersed throughout the interstices of the silicon and where the silicon atoms become intimately bonded to the silicon carbide granules in an interlocking structure.

15. A heating element formed of carbonaceous resistance material for epitaxial deposition furnaces and the like, said heating element having a first coating comprising silicon vapor deposited on the surface of the heating element and being fused to the surface thereof, and a second coating comprising silicon carbide vapor deposited on the surface of the first coating and being dispersed in the silicon and intimately bonded to the silicon in an interlocking structure to form a uniformly distributed gas impervious layer on said element.

16. A heating element formed of carbonaceous resistance material for epitaxial deposition furnaces and the like, said heating element having a first coating comprising silicon vapor deposited on the surface of the heating element and being fused to the surface thereof, a second coating comprising silicon carbide deposited on the first coating and being dispersed in the silicon and intimately bonded to the silicon in an interlocking structure, and a third coating comprising silicon vapor deposited on the second coating to form a uniformly distributed gas impervious layer on said element.

17. A heating element formed of carbonaceous resistance material for epitaxial deposition furnaces and the like, said heating element having a first coating comprising silicon vapor deposited on the surface of the heating element and being fused to the surface thereof, and a second coating comprising silicon carbide vapor deposited on the first coating and being dispersed in the silicon and intimately bonded to the silicon in an interlocking structure to form a uniformly distributed gas impervious layer on said element, a portion of said first coating reacting with said heating element to form silicon carbide which penetrates into said heating element.

18. A heating element formed of carbonaceous resistance material for epitaxial deposition furnaces and the like, said heating element having a first coating comprising silicon vapor deposited on the surface of the heating element and being fused to the surface thereof, a second coating comprising silicon carbide vapor deposited on the surface of the first coating and being dispersed in the silicon and intimately bonded to the silicon in an interlocking structure, and a third coating comprising silicon vapor deposited on the second coating and being widely dispersed throughout the interstices of the siilcon carbide coating to form a uniformly distributed gas impervious layer on said element.

References Cited

The following references, cited by the Examiner, are of record in the patented file of this patent or the original patent.

UNITED STATES PATENTS

| | | | |
|---|---|---|---|
| 2,614,947 | 12/1952 | Heyroth | 117—106 |
| 2,922,722 | 1/1960 | Hutcheon | 117—228 X |
| 2,992,127 | 7/1961 | Jones | 117—228 X |
| 3,019,128 | 1/1962 | Smiley | 117—228 X |
| 3,078,328 | 2/1963 | Jones | 117—215 X |
| 3,095,316 | 6/1963 | Hartwig | 117—106 X |
| 3,099,534 | 7/1963 | Schweickert et al. | 117—106 |
| 3,164,489 | 1/1965 | Timper | 117—212 |

ALFRED A. LEAVITT, Primary Examiner

C. K. WEIFFENBACH, Assistant Examiner

U.S. Cl. X.R.

117—106, 228; 338—256, 262

PO-1050
(5/69)

UNITED STATES PATENT OFFICE
CERTIFICATE OF CORRECTION

Patent No. RE 26,885 Dated December 23, 1968

Inventor(s) Darrel M. Harris

It is certified that error appears in the above-identified patent and that said Letters Patent are hereby corrected as shown below:

Column 19, line 61 "partion" should be --portion--.

Column 20, line 67 after ing, left out --having a second coating--.

Column 20, lines 69-70, after silicon "cargide" should be --carbide--.

Signed and sealed this 4th day of July 1972.

(SEAL)
Attest:

EDWARD M. FLETCHER, JR.
Attesting Officer

ROBERT GOTTSCHALK
Commissioner of Patents